US012800520B2

(12) United States Patent
Taguchi et al.

(10) Patent No.: US 12,800,520 B2
(45) Date of Patent: Nov. 17, 2026

(54) INFORMATION PROCESSING SYSTEM, INFORMATION PROCESSING METHOD, PROGRAM AND INFORMATION PROCESSING APPARATUS

(71) Applicant: RIGAKU CORPORATION, Tokyo (JP)

(72) Inventors: Shota Taguchi, Tokyo (JP); Takumi Ota, Tokyo (JP)

(73) Assignee: RIGAKU CORPORATION, Tokyo (JP)

( * ) Notice: Subject to any disclaimer, the term of this patent is extended or adjusted under 35 U.S.C. 154(b) by 156 days.

(21) Appl. No.: 19/001,077

(22) Filed: Dec. 24, 2024

(65) Prior Publication Data

US 2025/0208068 A1 Jun. 26, 2025

(30) Foreign Application Priority Data

Dec. 25, 2023 (JP) ................................ 2023-218336

(51) Int. Cl.
*G01N 23/046* (2018.01)

(52) U.S. Cl.
CPC ..... *G01N 23/046* (2013.01); *G01N 2223/309* (2013.01); *G01N 2223/401* (2013.01)

(58) Field of Classification Search
None
See application file for complete search history.

(56) References Cited

U.S. PATENT DOCUMENTS

2019/0261940 A1* 8/2019 Son ........................ A61B 6/032

FOREIGN PATENT DOCUMENTS

JP 2018-099175 A 6/2018

* cited by examiner

*Primary Examiner* — Marcus H Taningco
(74) *Attorney, Agent, or Firm* — XSENSUS LLP

(57) ABSTRACT

To provide a technique for correcting SOD shifts with no distance sensor for CT devices, and an information processing system for processing information with the CT device. The CT device includes: a sample stage to place a sample; an X-ray generator generating a cone beam X-ray toward the sample and rotated around a rotation axis with respect to the sample stage; and a detector detecting the cone beam X-ray transmitted through the sample as measurement data, The information processing system includes a processor(s) executing: a tentative correction step of acquiring a tentatively corrected reconstruction image for the plural tentative correction parameters from the measurement data, by using a tentative correction function; an index calculation step of calculating an index related to sharpness of each tentatively corrected reconstruction image; and a shift quantity specification step of specifying a correction function of the SOD based on the plural calculated indices.

11 Claims, 11 Drawing Sheets

INFORMATION PROCESSING SYSTEM, INFORMATION PROCESSING METHOD, PROGRAM AND INFORMATION PROCESSING APPARATUS

CROSS-REFERENCE TO RELATED APPLICATION

The present application claims priority under 35 U.S.C. § 119 to Japanese Patent Application No. 2023-218336, filed Dec. 25, 2023, the contents of which are incorporated herein by reference in their entirety. The present disclosure relates to an information processing system, an information processing method, a program and an information processing apparatus.

RELATED ART

Patent document 1 discloses a technique for correcting a gap of a mechanical unit in a radiographic apparatus, based on distance information obtained from rotation of the mechanical unit in the radiographic apparatus.

PRIOR ART DOCUMENTS

Patent Document

[Patent Document 1] JP 2018-99175 A

SUMMARY

Problems to be Solved by Invention

However, in Patent Document 1, a distance sensor has been required to correct the gap.

In the light of the above circumstances, the present disclosure provides a technique for correcting SOD shifts without requiring any distance sensor for CT devices.

Means for Solving Problems

According to one aspect of the present disclosure, an information processing system for processing information between a CT device and the information processing system is provided. The CT device in this information processing system includes a sample stage, an X-ray generator and a detector. A sample is placed on the sample stage. The X-ray generator is configured to generate a cone beam X-ray toward the sample, and to be rotated around a rotation axis with respect to the sample stage. The detector detects the cone beam X-ray that has transmitted through the sample as measurement data. The information processing system includes at least one processor that executes following respective steps. In a tentative correction step, a tentatively corrected reconstruction image is acquired for each plurality of the tentative correction parameter from the measurement data, by using a tentative correction function which employs an angle position of the X-ray generator with respect to the rotation axis as a variable and the tentative correction parameter related to an SOD as a parameter. The SOD is a distance between the X-ray generator and the rotation axis. The tentatively corrected reconstruction image is an image obtained by reconstructing the sample in a predetermined plane. In an index calculation step, an index related to sharpness of each of the tentatively corrected reconstruction image acquired for said each plurality of the tentative correction parameter is calculated. In a shift quantity specification step, a correction function of the SOD is specified based on a plurality of the calculated index.

According to the present disclosure, the SOD shift can be corrected without requiring any distance sensor for the CT device.

DETAILED DESCRIPTION

Embodiment

The embodiment of the present disclosure will be described below with reference to the drawings. Various features shown in the following embodiment can be combined with each other.

The program for realizing software used in this embodiment may be provided as a non-transitory computer-readable medium, may be provided to be downloadable from an external server, or may be provided so that the program can be started on an external computer to realize its functions on a client device (so-called cloud computing).

In this embodiment, the term "part" in the present embodiment may include, for example, hardware resources implemented by circuits in a broad sense, together with information processing of software which may be specifically realized by those hardware resources. In addition, although various types of information are handled in this embodiment, such information may be represented by physical values of signal values representing, for example, voltage and current, high and low signal values as a binary bit array consisting of 0 or 1, or quantum superposition (so-called quantum bits), and communication and computation may be performed on a circuit in a broad sense A circuit in a broad sense means a circuit realized by combining a circuit, circuitry, a processor, a memory and the like in an appropriate combination. That is, such circuits include an application specific integrated circuit (ASIC), a programmable logic device (e.g., a simple programmable logic device (SPLD), a complex programmable logic device (CPLD), etc.), and an integrated circuit (IC), a field programmable gate array (FPGA) and the like.

1. System Configuration and Hardware Configuration of Information Processing System 1

Figure 1:
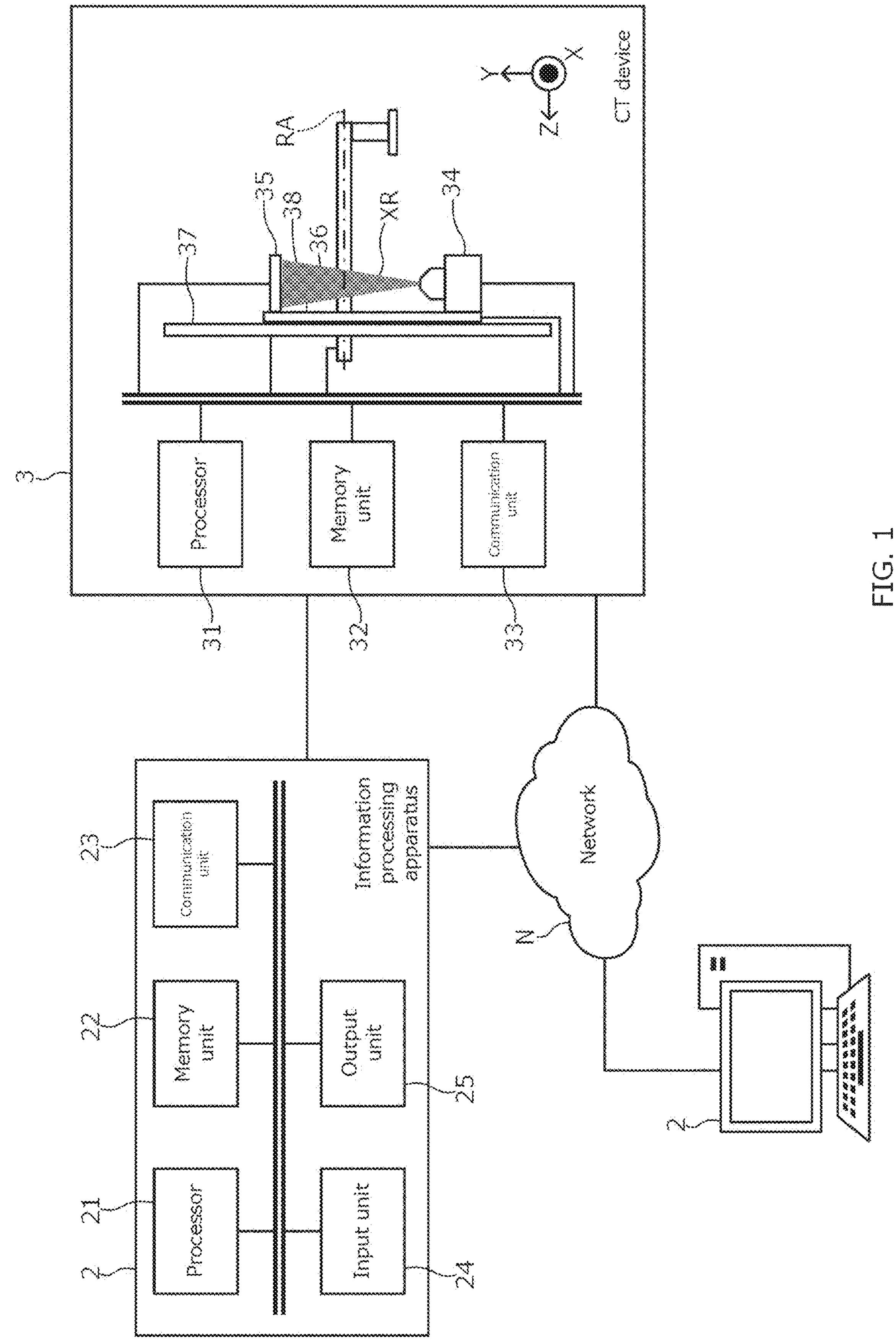
FIG. 1 is a view illustrating an example of a system configuration and a hardware configuration of an information processing system 1.

Firstly, a system configuration and a hardware configuration of an information processing system 1 of the present embodiment will be described with reference to FIG. 1. FIG. 1 is a view illustrating an example of a system configuration and a hardware configuration of the information processing system 1.

(Information Processing System 1)

As shown in FIG. 1, the information processing system 1 includes an information processing apparatus 2 and a CT (Computed Tomography) device 3. The information processing apparatus 2 and the CT device 3 are configured communicatively with each other via a communication cable or a network N. Thereby, the information processing apparatus 2 and the CT device 3 can transmit or receive various information to each other. Herein, a system exemplified by the information processing system 1 is composed of one or more apparatuses or components. Therefore, even the stand-alone information processing apparatus 2 or the stand-alone CT device 3 may also be included in the system exemplified by the information processing system 1. The information processing apparatus 2 and the CT device 3 are operated by a user who is, for example, a measurer.

(Information Processing Apparatus 2)

The information processing apparatus 2 is a PC (Personal Computer). The information processing apparatus 2 may be a tablet-type computer, a smart phone, etc., instead of a PC. The information processing apparatus 2 is an apparatus for processing information between the CT device 3 and the information processing apparatus 2. Specifically, for example, the information processing apparatus 2 is configured to be able to control arbitrary information processing to measurement data acquired from the CT device 3, control an X-ray XR generated from an X-ray generator 34, acquire a projection image detected by a detector 35, control movement of a sample holder 36, control rotation of a gantry unit 37, control a position of a variable magnification mechanism 38, and the like. Incidentally, the information processing apparatus 2 may be able to execute arbitrary information processing related to the CT device 3 as a result, and another information processing apparatus may be intervened between the information processing apparatus 2 and the CT device 3. As shown in FIG. 1, the information processing apparatus 2 includes a processor 21, a memory unit 22, a communication unit 23, an input unit 24 and an output unit 25, and these components are electrically connected via a communication bus inside the information processing apparatus 2. The information processing apparatus 2 executes processing according to the embodiment.

The processor 21 processes and controls an entire action related to the information processing apparatus 2. The processor 21 is, for example, a central processing unit (CPU). Information processing by a program stored in the memory unit 22 is specifically realized by the processor 21, which is an example of the hardware, thereby being executed as each functional unit included in the processor 21. By each functional unit included in the processor 21, for example, below-described processing shown in FIG. 5 can be realized. Incidentally, the processor 21 is not limited to be a single, but may be implemented to have a plurality of the processor 21 for each function. Also, the processor 21 may have a form of a combination of these.

The memory unit 22 stores various information defined by the above description. For example, the memory unit 22 may be implemented as a storage device such as a solid state drive (SSD) that stores various programs, etc. related to the information processing apparatus 2, which are executed by the processor 21, or as a memory such as a random access memory (RAM) that stores temporarily necessary information (arguments, arrays, etc.) for program calculations. The memory unit 22 stores various programs and variables related to the information processing apparatus 2, which are executed by the processor 21, and data used by the processor 21 to execute the processing based on the programs. The memory unit 22 may be an example of the storage medium.

The communication unit 23 is preferably a wire communication means such as USB, IEEE1394, Thunderbolt (registered trademark), wired LAN network communication, etc., but may also include wireless LAN network communication, mobile communication such as LTE/3G/4G/5G, Bluetooth (registered trademark) communication, and the like as necessary. More preferably, integration of these plural communication means is used. That is, the information processing apparatus 2 may communicate various information from outside via the communication unit 23.

The input unit 24 may be included in a housing of the information processing apparatus 2, or may be attached thereto externally. For example, the input unit 24 may be integrated with the output unit 25 and implemented as a touch panel. If the input unit 24 is implemented as a touch panel, a user can input by tap operations, swipe operations and the like. Needless to say, a switch button, a mouse, a keyboard or the like may be employed instead of a touch panel. That is, the input unit 24 accepts an input based on the operation performed by the user. The input is transferred as an instruction signal via the communication bus to the processor 21, and the processor 21 may execute predetermined control or calculation as necessary.

The output unit 25 can function as a display device of the information processing apparatus 2. The output unit 25 may be included in the housing of the information processing apparatus 2, or may be attached thereto externally. The output unit 25 displays a screen of a graphical user interface (GUI) that can be operated by a user. This displaying is preferably performed by a display device, for example, a CRT display, a liquid crystal display, an organic EL display, a plasma display or the like, depending on a type of the information processing apparatus 2.

(CT Device 3)

Figure 2:
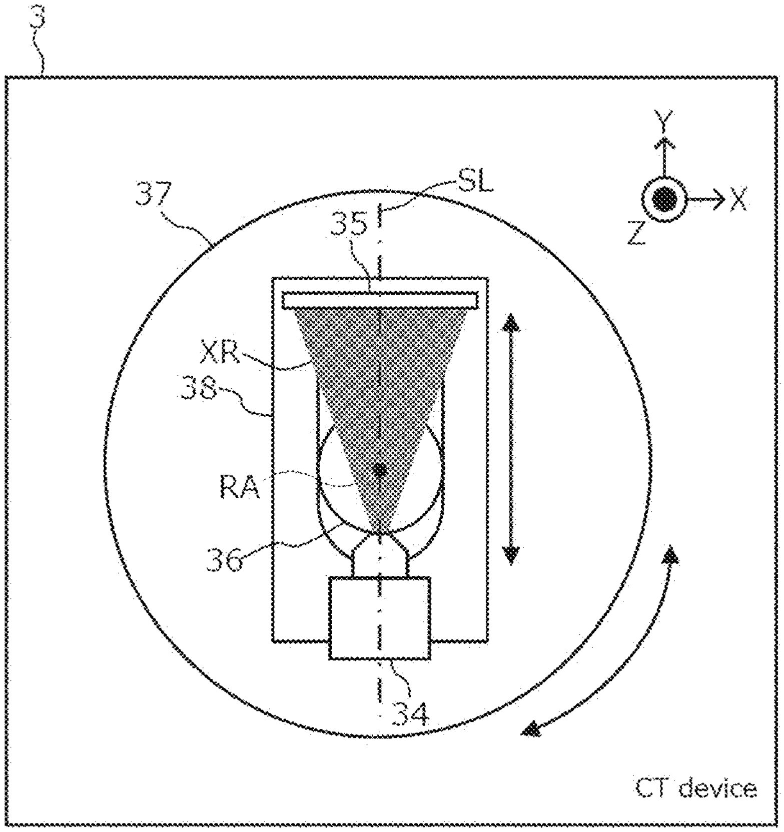
FIG. 2 is a view illustrating an example of a CT device 3.

Next, the CT device 3 will be explained with reference to FIGS. 1 and 2. In FIG. 1 and FIG. 2, components of the CT device 3 may be shown at different proportions from actual ones in order to illustrate characteristic parts in an understandable manner. Further, in the present specification, three spatial axes that orthogonally cross each other are denoted by X, Y, and Z axes, and directions along the X, Y, and Z axes are denoted by an X-axis direction, a Y-axis direction and a Z-axes direction, respectively. The CT device 3 in FIGS. 1 and 2 are observed from the X-axis direction and the Z-axis direction, respectively.

FIG. 2 is a view illustrating an example of a CT device 3. The CT device 3 is a device capable of irradiating a sample with the X-ray XR and acquiring a projection image of the sample from quantity of the transmitted X-ray XR. Plural projection images acquired by irradiating a certain sample with X-rays from various directions are used as data for reconstructing a three dimensional image of the sample and a cross-sectional view of the sample cut along an arbitrary plane. The CT device 3 of the present embodiment horizontally holds a sample placed on the sample stage, and acquires projection images of the sample while rotating a gantry unit 37, thus may also be called as a gantry-type CT device. As shown in FIG. 1, the CT device 3 includes a processor 31, a memory unit 32, a communication unit 33, the X-ray generator 34, the detector 35, the sample holder 36, the gantry unit 37 and the variable magnification mechanism 38, and these components are electrically connected via a communication bus inside the CT device 3. The CT device 3 executes the processing according to the embodiment. As to the processor 31, the memory unit 32 and the communication unit 33 of the CT device 3, the description of the processor 31, the memory unit 22 and the communication unit 23 of the information processing apparatus 2 is to be referred.

The X-ray generator 34 generates a cone beam X-ray XR so that the X-ray XR may be irradiated toward an area including the sample placed on the sample holder 36. The cone beam X-ray XR may be shaped so that an irradiation range of the X-ray XR may be expanded along a direction of travel of the X-ray beam, and may include a fan beam X-ray or the like. The X-ray generator 34 is configured to be rotated around a rotation axis RA of the gantry unit 37 with respect to the sample stage. Further, the X-ray generator 34 may also be configured to irradiate an X-ray including a characteristic X-ray such as CuKα and FeKα.

The detector 35 is configured to be able to detect the X-ray that is transmitted through the sample placed on the sample holder 36. The detected X-ray XR is analyzed as measurement data by the information processing apparatus 2. The measurement data is data obtained by the measurement by the CT device 3. The measurement data includes information indicating an angle of rotation of the gantry unit 37 and information on a projection image that corresponds to the angle. The detector 35 is configured to be rotated around the rotation axis RA of the gantry unit 37 with respect to the sample stage. As the detector 35, a two-dimensional detector using a CCD, an imaging plate or the like may be used.

The sample holder 36 is configured to be able to hold the sample stage on the rotation axis RA of the gantry unit 37. The sample holder 36 may be configured to be able to move the sample stage in an arbitrary direction based on a movement instruction generated by the processor 21 or the processor 31. The sample stage is configured to be able to place the sample. The sample to be used for acquiring the correction function may be any arbitrary objects or organisms, and is not limited to specific samples such as standard samples.

As shown in FIG. 2, the gantry unit 37 is configured to rotate the X-ray generator 34 and the detector 35 around the rotation axis RA. The gantry unit 37 rotates the X-ray generator 34 and the detector 35 fixed to the variable magnification mechanism 38. A plane defined by the X-axis and the Y-axis is parallel to a plane defined by a radial direction of the rotating gantry unit 37, and the Z-axis is parallel to the rotation axis RA of the gantry unit 37.

The variable magnification mechanism 38 is a mechanism for adjusting an magnification ratio of a projection image at a time of acquisition. As shown in FIG. 2, the variable magnification mechanism 38 is configured to be able to adjust a focal point of the X-ray XR, by changing a distance between the X-ray generator 34 and the sample. Since the shorter the distance between an X-ray focal point and the sample, the higher the magnification ratio of the projection image becomes, acquisition with higher spatial resolution becomes possible. As shown in FIG. 2, the variable magnification mechanism 38 is a plate on which the X-ray generator 34 and the detector 35 are fixed, and the X-ray generator 34 and the detector 35 can be moved integrally in the direction of the optical axis without changing a position of the sample, by sliding the plate. The variable magnification mechanism 38 is provided with the X-ray generator 34 and the detector 35, and a straight line SL which connects the X-ray generator 34 and the detector 35 crosses the rotation axis RA of the gantry unit 37.

Figure 3:
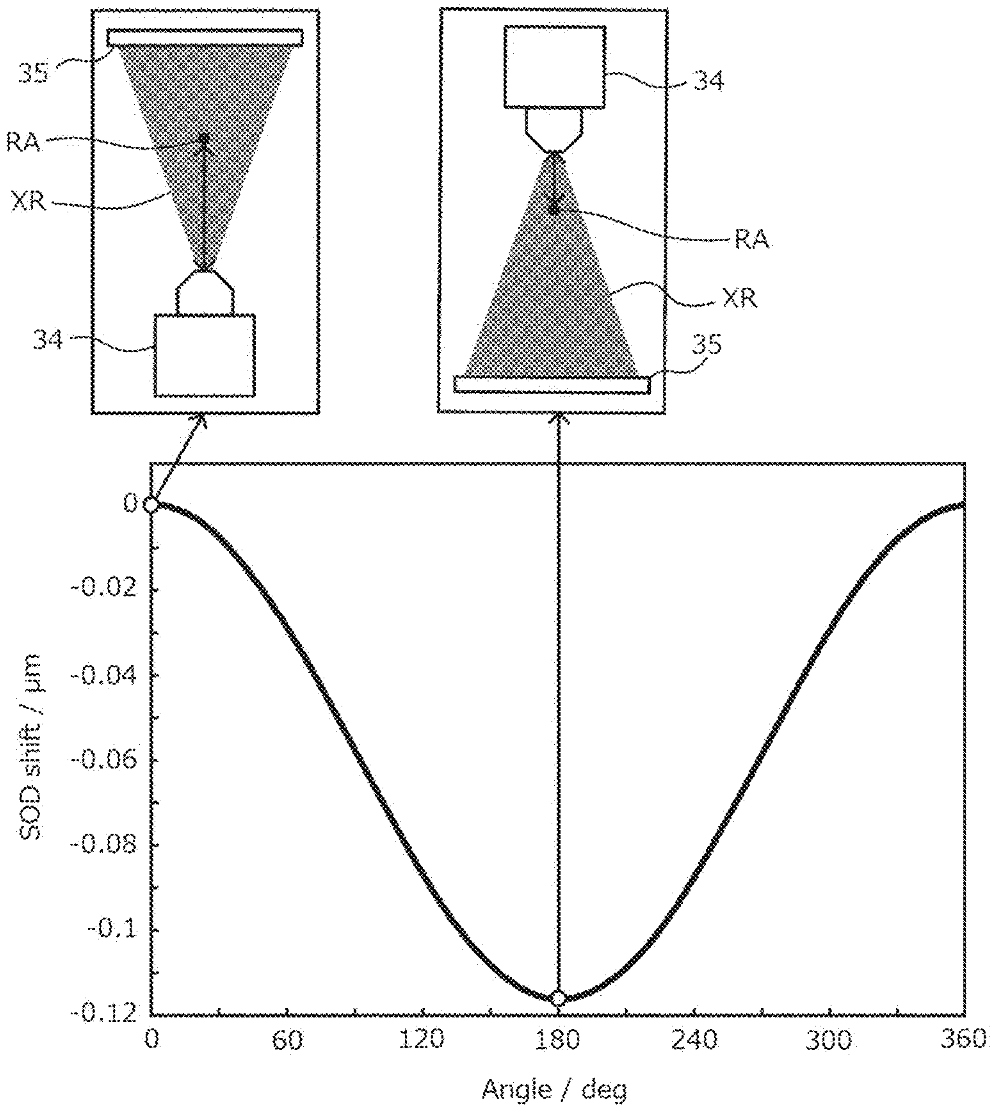
FIG. 3 is a view for explaining an SOD shift.

FIG. 3 is a view for explaining an SOD shift. FIG. 3 includes a graph with a value of the SOD shift in a vertical axis and a value of an angle (angle of the acquisition) of the gantry unit 37 in the horizontal axis. The SOD (Source-to-Object Distance) denotes a distance between the X-ray generator 34 and the rotation axis RA. Further, the SOD may also be interpreted as the distance between the X-ray generator 34 and the sample. The SOD shift means a gap generated in the SOD. The SOD shift is one of tolerance errors caused in the CT device 3, which is derived from a position gap in a gravity direction that is generated by the variable magnification mechanism 38 due to the gravity. While the variable magnification mechanism 38 that has caused the SOD shift is rotated, the quantity of the SOD shift is changed according to the angle of the gantry unit 37 (the angle of the acquisition) in a manner of drawing a cosine function (cosine curve), as shown in FIG. 3. For example, the quantity of the SOD shift starts at a position where the angle position θ of the gantry unit 37 is 0° (i.e. θ=0°, at an arrangement where the X-ray generator 34 (the focus of the X-ray XR), the rotation axis RA of the gantry unit 37 and the center of the detector 35 are aligned vertically in this order from a bottom) as a starting point, becomes the largest at a position where the angle position θ of the gantry unit 37 is 180° (i.e. θ=180°, at an arrangement where the X-ray generator 34 (the focus of the X-ray XR), the rotation axis RA of the gantry unit 37 and the center of the detector 35 are aligned vertically in this order from a top), and returns closer to the position where the angle position θ of the gantry unit 37 is 0° as the angle position θ of the gantry unit 37 becomes closer to the position of θ=360°. Therefore, as the tentative correction function and the correction function of the SOD shift, the function that fits this cosine function can be used, as described in the present embodiment. Incidentally, the correction function is a function that can correct the SOD shift in a certain measurement condition of the CT device 3. The tentative correction function is a function that is tentatively set by using the tentative correction parameter in order to specify the correction function. The tentative correction parameter is a parameter that is tentatively provided in the tentative correction function. The correction parameter is a parameter specified by using the index related to sharpness. These will be explained below in detail.

2. Functional Configuration of Processor 21 of Information Processing Apparatus 2

Figure 4:
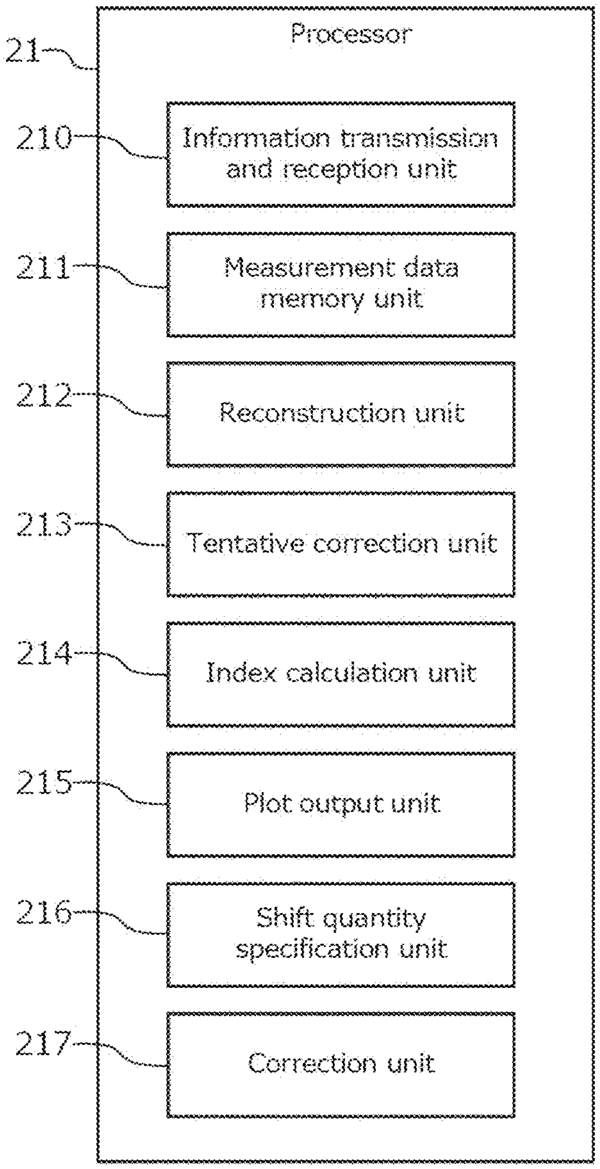
FIG. 4 is a view illustrating an example of a functional unit included in a processor 21.

FIG. 4 is a view illustrating an example of a functional unit included in a processor 21. As shown in FIG. 4, the processor 21 is provided with an information transmission and reception unit 210, a measurement data memory unit 211, a reconstruction unit 212, a tentative correction unit 213, an index calculation unit 214, a plot output unit 215, a shift quantity specification unit 216 and a correction unit 217. The processor 21 executes at least a tentative correction step, an index calculation step, a shift quantity specification step and a correction step.

The information transmission and reception unit 210 accepts, receives or acquires various information from the CT device 3 via the communication unit 23. The information transmission and reception unit 210 transmits various information via the communication unit 23 to the CT device 3.

The measurement data memory unit 211 allows the memory unit 22 to store measurement data acquired from the CT device 3.

The reconstruction unit 212 reconstructs an image of the sample from a plural projection images.

The tentative correction unit 213 acquires a tentatively corrected reconstruction image from the plural projection images to which the tentative correction function is applied.

The index calculation unit 214 calculates an index that represents sharpness of each tentatively corrected reconstruction image.

The plot output unit 215 outputs a plot of an index for a hypothesized tentative correction parameter.

The shift quantity specification unit 216 specifies the correction parameter so as to specify the correction function that indicates an actual quantity of the SOD shift.

The correction unit 217 corrects the actual quantity of the SOD shift so as to reconstruct the projection image, thereby acquiring a corrected reconstruction image.

Details of the information transmission and reception unit 210, the measurement data memory unit 211, the reconstruction unit 212, the tentative correction unit 213, the index calculation unit 214, the plot output unit 215, the shift quantity specification unit 216 and the correction unit 217 will be described below.

3. Flow of Action of Information Processing System 1

Figure 5:
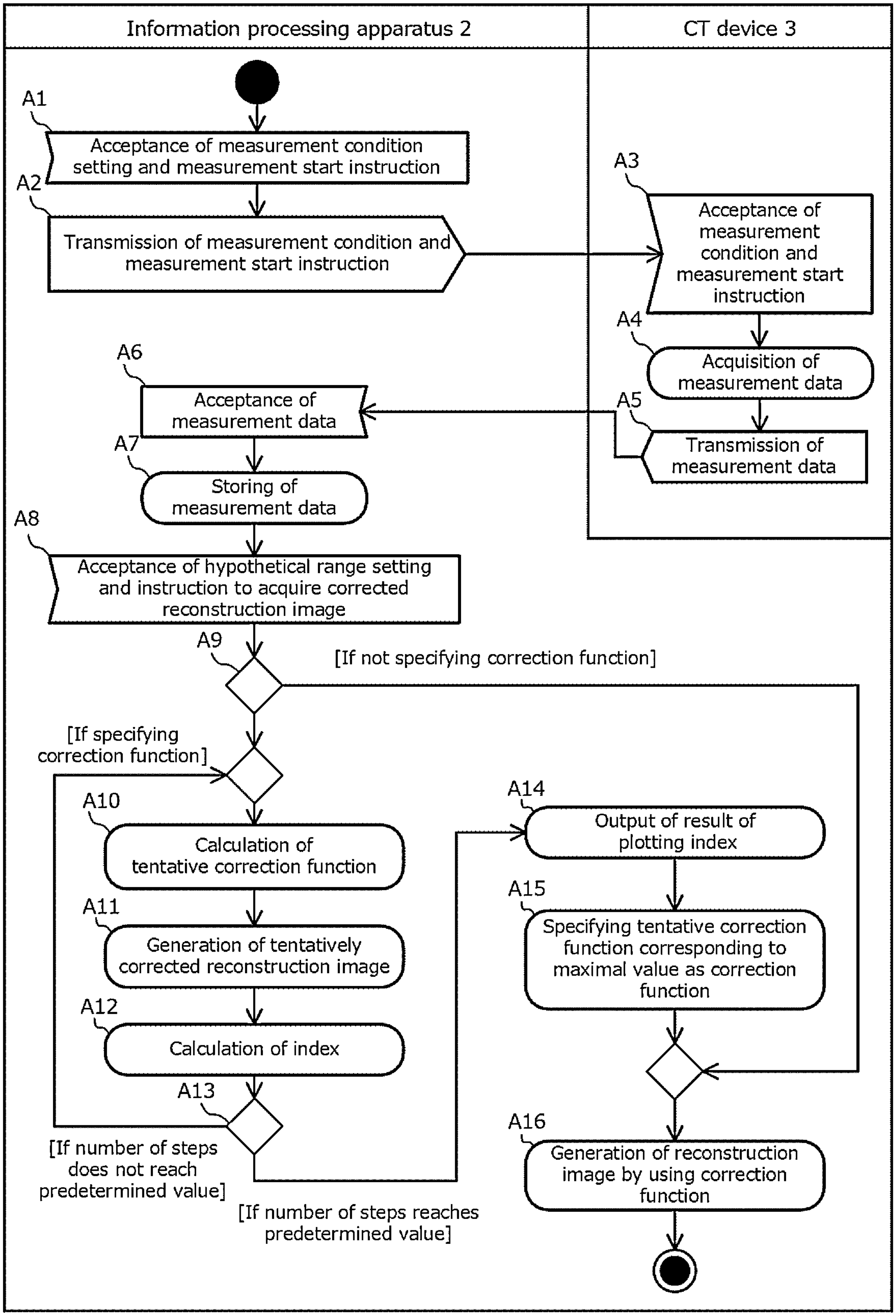
FIG. 5 is a view illustrating an example of an activity executed by the information processing system 1.

Next, a preferred example of information processing executed by the information processing system 1 of the present embodiment will be described. In this section, an example of specifying the correction function based on Formulae 1 and 2 and outputting the corrected reconstruction image by using the specified correction function will be explained with reference to an activity diagram of FIG. 5. FIG. 5 is a view illustrating an example of an activity executed by the information processing system 1. Incidentally, the activity may include arbitrary exceptional processing, which is not shown in the view. The exceptional processing includes interruption of the information processing and omission of each processing. For example, when specifying the correction function from the already acquired measurement data, the information processing system 1 omits information processing of Activities A1 to A7.

(Activity A1)

Firstly, the processor 21 of the information processing apparatus 2 accepts setting of the measurement condition and an instruction to start measurement by the CT device (hereinafter referred to as a measurement start instruction) from the user via the input unit 24.

(Activity A2)

Subsequently, the information transmission and reception unit 210 transmits the measurement condition and the measurement start instruction via the communication unit 23 to the CT device 3.

(Activity A3)

Then, the processor 31 of the CT device 3 accepts the measurement condition and the measurement start instruction from the information processing apparatus 2 via the communication unit 33.

(Activity A4)

Thereafter, the CT device 3 acquires the measurement data based on the accepted measurement condition.

(Activity A5)

Subsequently, the processor 31 of the CT device 3 transmits the measurement data via the communication unit 33 to the information processing apparatus 2.

(Activity A6)

Then, the information transmission and reception unit 210 of the information processing apparatus 2 accepts the measurement data from the CT device 3 via the communication unit 23.

(Activity A7)

Thereafter, the measurement data memory unit 211 allows the memory unit 22 to store the acquired measurement data.

(Activity A8)

Subsequently, the processor 21 accepts setting of a hypothesized range of the SOD shift (hereinafter referred to as hypothetical range setting) and an instruction to acquire the corrected reconstruction image from the user via the input unit 24. The processor 21 proceeds the information processing to Activity A9.

(Activity A9)

Then, if having specified a correction function in a certain measurement condition in the past, the processor 21 of the information processing apparatus 2 can use the specified correction function in a measurement condition similar to the past measurement condition. That is, the correction function is stored in the memory unit 22 for each measurement condition. The measurement condition is a condition for the measurement by the CT device 3, and includes, for example, at least one condition of the number of images to be acquired, scanning speed, exposure time and an magnification ratio of an image to be acquired. If outputting the reconstruction image by using the specified correction function, the processor 21 proceeds the information processing to Activity A16. On the other hand, if specifying a new correction function, the processor 21 proceeds the information processing to Activity A10. According to this configuration, the correction of the SOD shift corresponding to the various measurement conditions can be executed. Further, according to this configuration, the correction function acquired in a certain measurement condition can be reused.

(Activity A10)

Subsequently, the tentative correction unit 213 hypothesizes a tentative correction parameter so as to calculate a tentative correction function. More specifically, for example, the tentative correction unit 213 calculates the tentative correction function which employs the angle position of the X-ray generator 34 with respect to the rotation axis RA as a variable and the tentative correction parameter for tentatively correcting the SOD shift as a parameter. The tentative correction function may be a function that includes the angle position of the X-ray generator 34 with respect to the rotation axis RA as a variable, and is not limited particularly. According to another viewpoint, the angle position of the X-ray generator 34 with respect to the rotation axis RA may be the angle of the gantry unit 37 or the angle of the acquisition.

The tentative correction function is, for example, below-described Formula 1. The tentative correction parameter is a parameter that is tentatively provided as a correction parameter. The tentative correction parameter includes a first tentative correction parameter as an $SOD_{amp}$ and a second tentative correction parameter as an $SOD_{offset}$. The tentative correction unit 213 varies: θ as the angle position of the X-ray generator 34 with respect to the rotation axis RA; the first tentative correction parameter; and the second tentative correction parameter. In the present embodiment, the $SOD_{amp}$ and the $SOD_{offset}$ are treated as equal parameters (i.e., $SOD_{amp}=SOD_{offset}$), but may be treated as different parameters. According to such a configuration, θ as the angle position of the X-ray generator 34 with respect to the rotation axis RA is employed as a variable, whereby plural tentatively corrected reconstruction images can be acquired.

$$f(\theta; SOD_{amp}, SOD_{offset}) = SOD_{amp}\cos\theta - SOD_{offset} \quad \text{[Formula 1]}$$

(Activity A11)

Thereafter, the tentative correction unit 213 acquires a tentatively corrected reconstruction image for each plurality of the tentative correction parameter from the measurement data, by using the tentative correction function that is hypothesized in Activity A10. The tentatively corrected reconstruction image is a two-dimensional image obtained by reconstructing the sample in a predetermined plane. The predetermined plane may be any arbitrary plane, but preferably includes an optical axis of the X-ray beam XR (which is the same as the straight line SL in the example of FIG. 2), if using Formula 1. According to this configuration, since the plane of the image to be reconstructed can be limited to a plane parallel to the optical axis, logic for specifying the correction function can be simplified. In addition, as a result of simplifying the logic for specifying the correction function, the information processing can be executed without using a large-sized computer.

(Activity A12)

Then, the index calculation unit 214 calculates an index related to sharpness of each tentatively corrected reconstruction image, which is acquired for each plurality of the tentative correction parameter. The index related to the sharpness is, for example, a total variation (TV) represented by Formula 2 below, but is not limited to it.

$$TV = \int dxdy\sqrt{\left(\frac{\partial f}{\partial x}\right)^2 + \left(\frac{\partial f}{\partial y}\right)^2} \quad \text{[Formula 2]}$$

(Activity A13)

Subsequently, the processor 21 of the information processing apparatus 2 judges whether a condition of a loop has been completed or not, by reaching of the number of steps of the hypothesized tentative correction parameter to a predetermined value, based on the hypothetical range setting accepted in Activity A8. If the loop condition is not completed, the processor 21 proceeds the information processing to Activity A10. If the loop condition is completed, the processor 21 proceeds the information processing to Activity A14.

(Activity A14)

Figure 6:
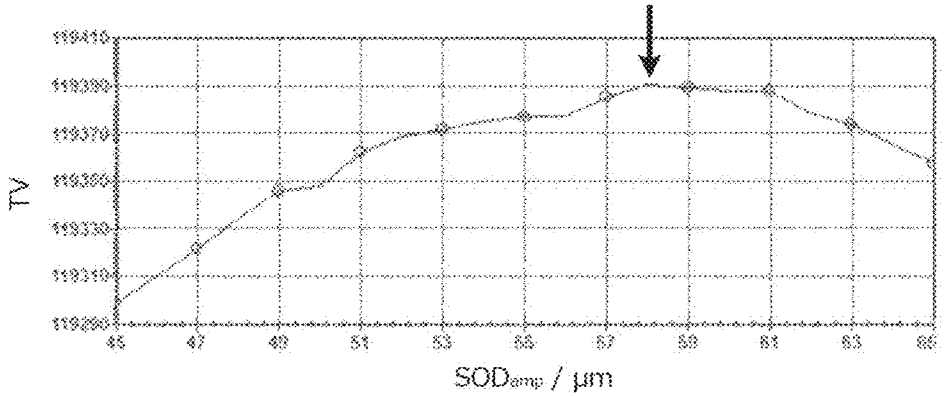
FIG. 6 is a view for explaining plots of an index.

Thereafter, the plot output unit 215 plots the plural indices acquired by repeating Activity A12. The result of the plotting is, for example, as shown in FIG. 6. FIG. 6 shows an example of the result of the plotting. FIG. 6 includes a graph with a value of the total variation in a vertical axis and a value of the hypothesized tentative correction parameter in a horizontal axis.

(Activity A15)

Then, the shift quantity specification unit 216 searches a maximal value of the index with respect to the tentative correction parameter (at a position of 58 μm pointed by an arrow in the example of FIG. 6). The shift quantity specification unit 216 specifies the correction function by applying the tentative correction parameter that corresponds to the maximal value of the plurality of the calculated index to the tentative correction function. The tentative correction parameter with respect to the thus searched maximal value can be specified as the actual correction parameter. According to this configuration, since the total variation is used as the index of the sharpness, the appropriate correction function can be specified.

(Activity A16)

Finally, the correction unit 217 outputs an image, which is reconstructed by using the correction function specified in Activity A15, as a corrected reconstruction image. The corrected reconstruction image is an image in a form with the SOD shift corrected by the correction function, which enables the observation of a three-dimensional image of the sample and a cross-sectional view cut along an arbitrary plane of the sample. According to this configuration, images reconstructed by using the correction function can be output.

Figure 7:
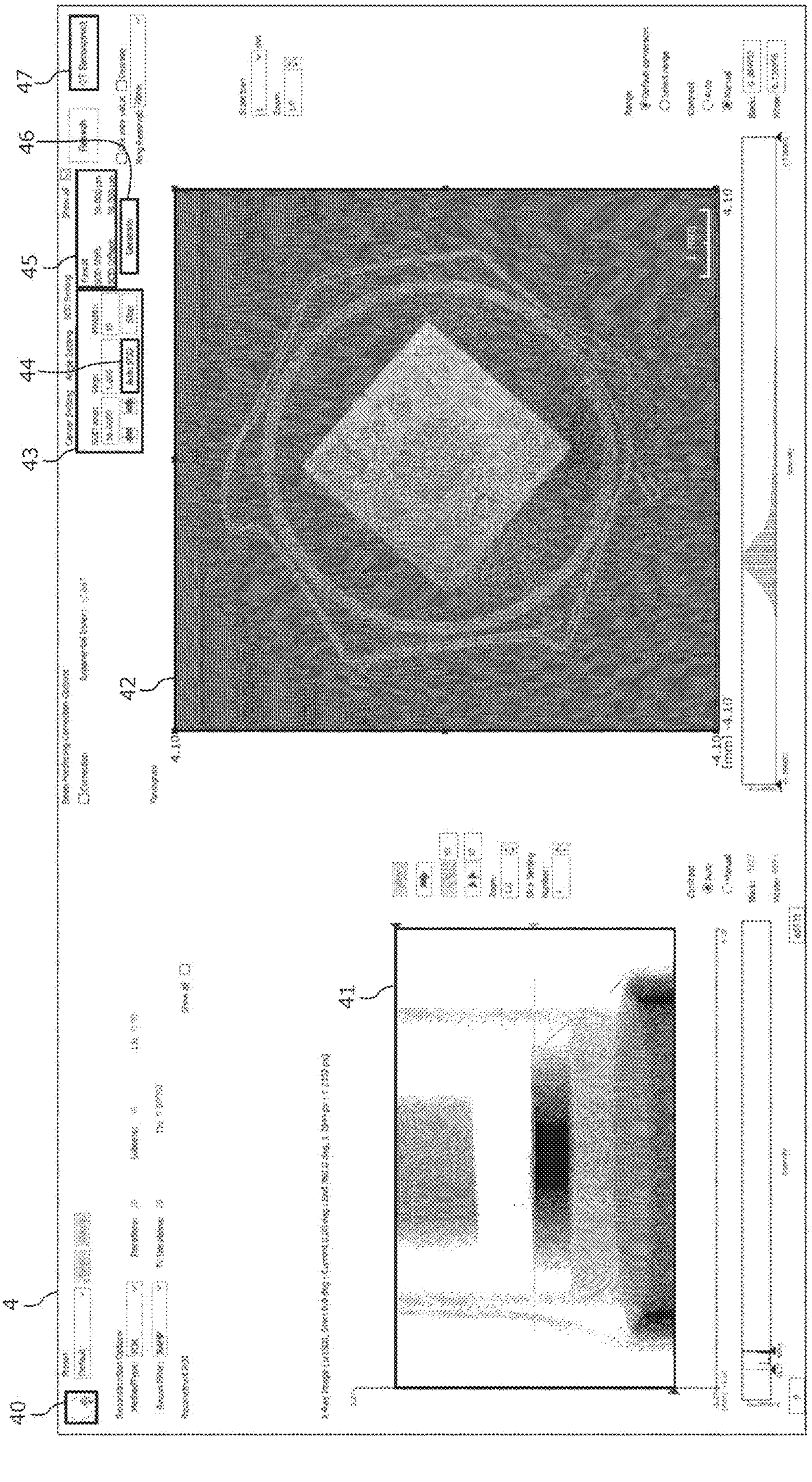
FIG. 7 is a view illustrating an example of a display screen 4.

FIG. 7 is a view illustrating an example of a display screen 4. While executing each of the information processing shown in FIG. 4, the processor 21 may allow the output unit 25 to display the display screen 4 shown in FIG. 7 in a form that can be identified by the user. The display screen 4 is a screen that can execute the start of measurement, the acquisition of reconstruction images, the correction of reconstruction images and the like in response to the operations by the user. The display screen 4 includes at least a reference button 40, a projection image display area 41, a reconstruction image area 42, a hypothetical condition area 43, an AutoSOD button 44, a result display area 45, a correction function save button 46 and a reconstruction image acquisition button 47.

The reference button 40 is a button for displaying a window in which files of measurement data are listed, and specifying a certain file of the measurement data therefrom.

The projection image display area 41 is an area in which the projection image acquired from the measurement data is displayed. By specifying a position of a line on the projection image display area 41, a cross-section of the reconstruction image perpendicular to its Z-axis can be specified.

The reconstruction image area 42 is an area in which the reconstruction image acquired from the measurement data is displayed.

The hypothetical condition area 43 is an area that enables to accept setting of an initial value, the number of steps and step widths of the tentative correction parameter to be hypothesized. The setting input via the hypothetical condition area 43 becomes the hypothetical range setting. For example, in Activities A10 to A13 in FIG. 5, the tentative correction unit 213 uses values obtained by dividing a range of values set by the user by the step widths set by the user as the plurality of the tentative correction parameter. According to this configuration, the tentative correction parameter can be verified within the range that is arbitrarily set by the user.

The AutoSOD button 44 is a button for instructing execution of the index calculation. For example, in response to push down of the AutoSOD button 44, the processor 21 starts the information processing of Activity A8 in FIG. 5.

The result display area 45 is an area in which the specified actual correction parameter (58 μm in the example of FIG. 7) is displayed. For example, the processor 21 allows to display the correction function specified by Activity A15 in FIG. 5.

The correction function save button 46 is a button for storing the specified correction function. As mentioned above, the correction function is stored in connection with the measurement condition.

The reconstruction image acquisition button 47 is a button for reconstructing an image from a projection image.

4. Example

Figure 8:
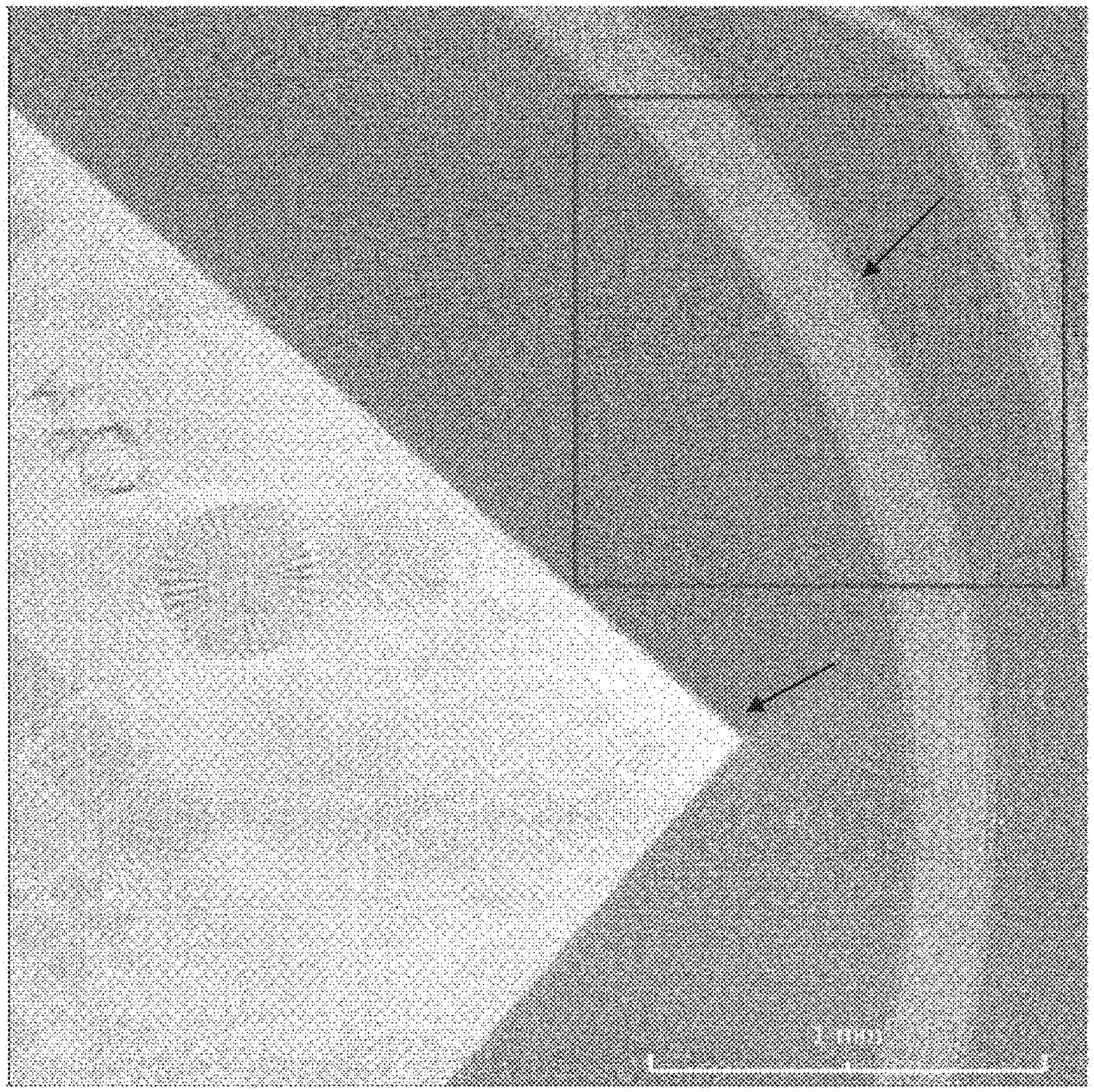
FIG. 8 is a view illustrating a reconstruction image before correction of a sample to be used.
Figure 9:
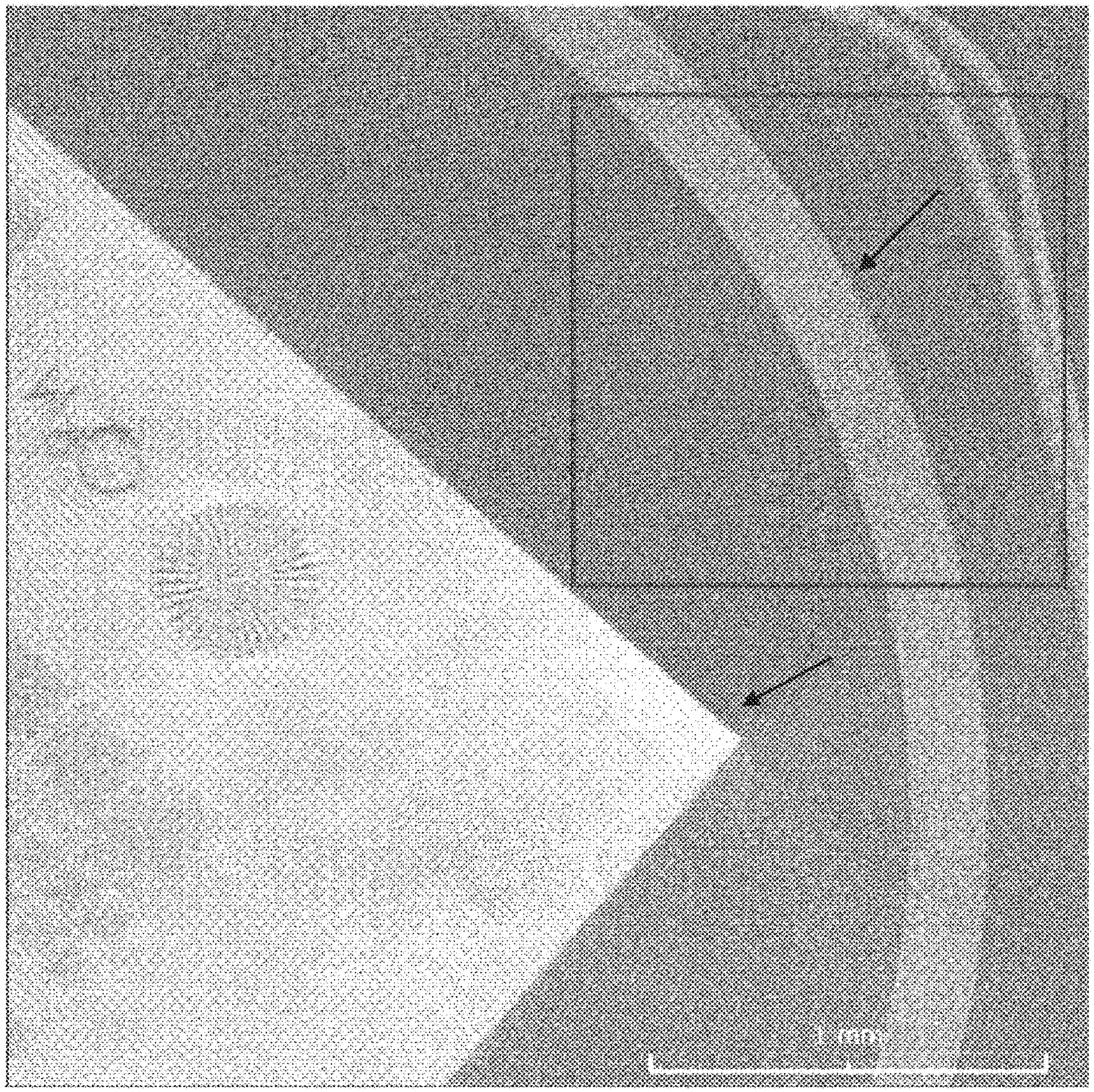
FIG. 9 is a view illustrating a reconstruction image after the correction of the sample to be used.
Figure 10:
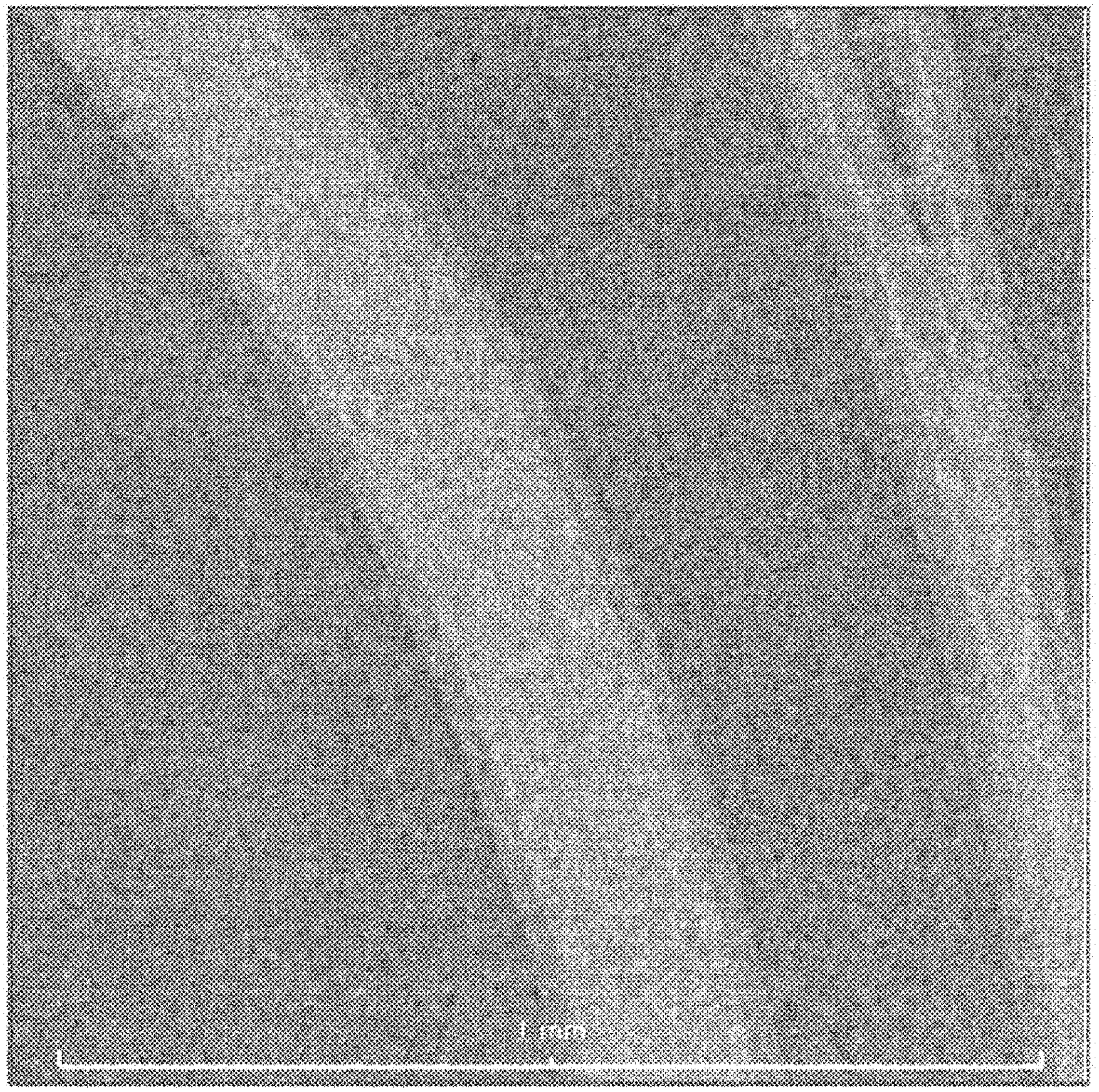
FIG. 10 is a view illustrating an enlarged reconstruction image of an area enclosed by a frame of FIG. 8 before the correction.
Figure 11:
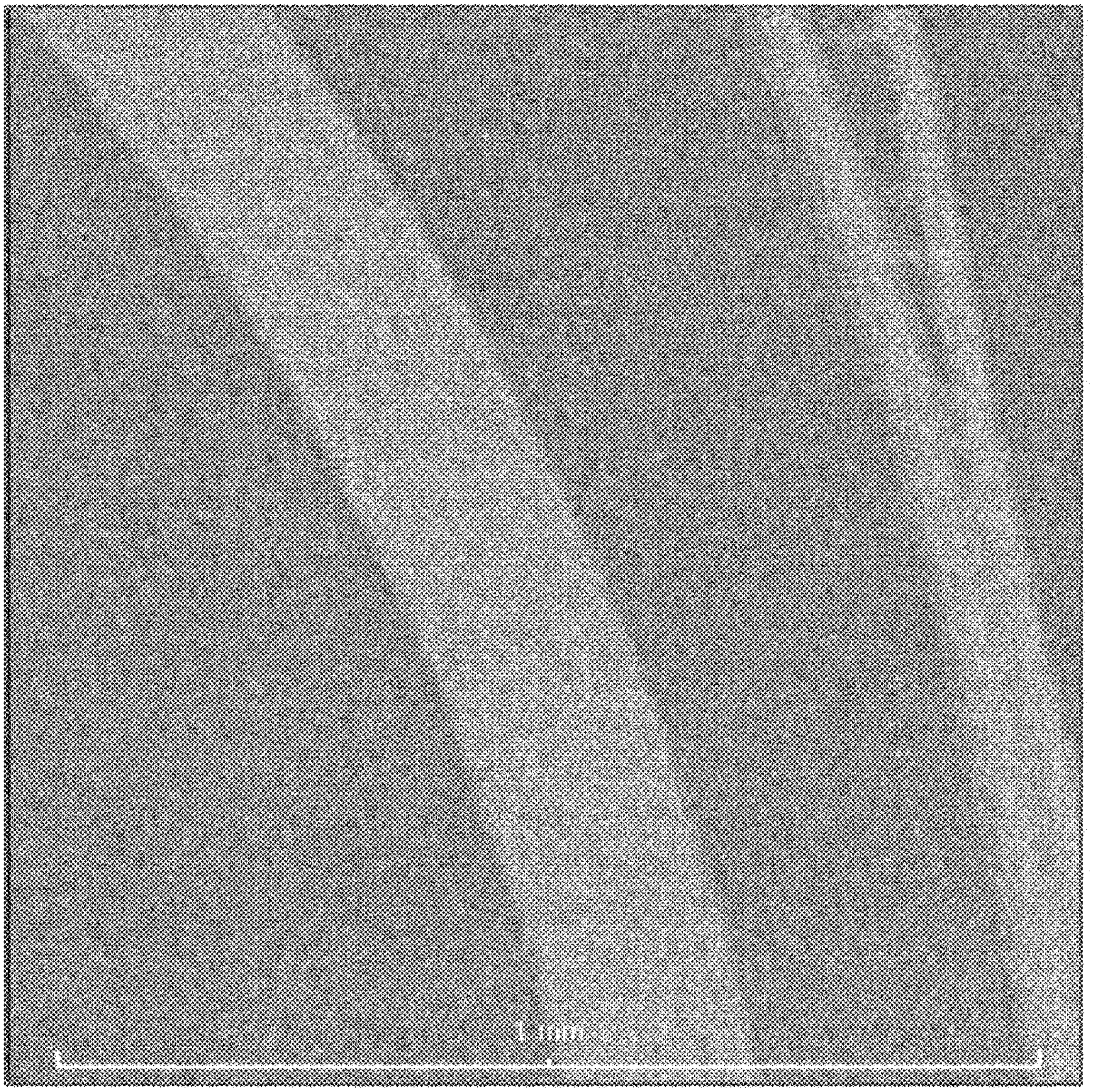
FIG. 11 is a view illustrating an enlarged reconstruction image of an area enclosed by a frame of FIG. 9 after the correction.

Next, an example about a change of the reconstruction image between before and after the application of the correction function that is acquired by the present disclosure will be described with reference to FIGS. 8 to 11. FIG. 8 is a view illustrating the reconstruction image before the correction of the sample that serves as a sample. FIG. 9 is a view illustrating the reconstruction image after the correction of the sample that serves as the sample. FIG. 10 is a view illustrating an enlarged reconstruction image of the area enclosed by a frame of FIG. 8 before the correction. FIG. 11 is a view illustrating an enlarged reconstruction image of the area enclosed by a frame of FIG. 9 after the correction. As shown in FIGS. 8 and 10, in the reconstruction image before the correction, particularly in parts indicated by arrows in FIG. 8, a boundary between the sample and a space cannot be recognized clearly, and an outline of the sample is blurred, whereby the reconstruction image is blurred. On the other hand, as shown in FIGS. 9 and 11, in the reconstruction image after the correction, particularly in parts indicated by arrows in FIG. 9, a boundary between the sample and a space can be recognized more clearly, whereby the reconstruction image is found to be sharper.

As described above, the present disclosure can provide the technique for correcting the SOD shift without requiring any distance sensor for the CT device.

[Other]

The program is a program that allows one or more computers to execute each functional unit (step). In addition, the information processing system 1 is provided with one or more computers that execute the program. As to the information processing system 1 according to the above-described embodiment, the program may be a program that allows a computer to function as the processor 21 of the information processing system 1. In addition, the program may be an information processing method executed by the information processing system 1 (or the processor 21 of the information processing apparatus 2).

The embodiment has provided the example in which the gantry-type CT device is used as the CT device, but in a modified example, a sample-rotation CT device may also be used as the CT device. In the sample-rotation CT device, a sample stage is rotated together with a sample. In the sample-rotation CT device, a sample holder (or the sample stage) generates a position gap in the gravity direction due to the gravity. Also in the sample-rotation CT device, an SOD shift is corrected by using a tentative correction function and a correction function.

The embodiment has provided the explanation based on the premise of using the total variation (TV) as the index related to the sharpness, but the present disclosure is not limited to this. In a modified example, as an index related to sharpness, for example, an index in an inclination angle method, a half value method, a Nitka method or the like may be used by drawing a line profile in a specific part of the reconstruction image, or in a case where a sample includes a dotted structure, an index of a half-value width of a point spread function, which is estimated by using blind deconvolution or the like, may also be used.

In addition, the present disclosure may be provided in the following forms.

(1) An information processing system for processing information between a CT device and the information processing system, wherein the CT device includes: a sample stage on which a sample is placed; an X-ray generator configured to generate a cone beam X-ray toward the sample and to be rotated around a rotation axis with respect to the sample stage; and a detector configured to detect the cone beam X-ray that is transmitted through the sample as measurement data, the information processing system comprising at least one processor that is configured to execute each step of: a tentative correction step of acquiring a tentatively corrected reconstruction image for each plurality of tentative correction parameter from the measurement data, by using a tentative correction function which employs an angle position of the X-ray generator with respect to the rotation axis as a variable and the tentative correction parameter related to an SOD as a parameter, where the SOD is a distance between the X-ray generator and the rotation axis, and the tentatively corrected reconstruction image is an image obtained by reconstructing the sample in a predetermined plane; an index calculation step of calculating an index related to sharpness of each of the tentatively corrected reconstruction image acquired for said each plurality of the tentative correction parameter; and a shift quantity specification step of specifying a correction function of the SOD based on a plurality of the calculated index.

According to this configuration, the SOD can be corrected without requiring any distance sensor for the CT device.

(2) The information processing system according to (1), wherein the tentative correction parameter includes a first tentative correction parameter and a second tentative correction parameter, the tentative correction function is represented by a following formula (1), $$f(\theta; SOD_{amp}, SOD_{offset}) = SOD_{amp}\cos\theta - SOD_{offset} \tag{1}$$

where the variable of the angle position of the X-ray generator with respect to the rotation axis is denoted by θ, the first tentative correction parameter is denoted by an $SOD_{amp}$, and the second tentative correction parameter is denoted by an $SOD_{offset}$, and the tentative correction step varies the first tentative correction parameter and the second tentative correction parameter.

According to such a configuration, a plurality of the tentatively corrected reconstruction image can be acquired by employing the position of the X-ray generator with respect to the rotation axis as the variable.

(3) The information processing system according to (1) or (2), wherein the index related to the sharpness is a total variation (TV) represented by a following formula (2), and $$TV = \int dxdy\sqrt{\left(\frac{\partial f}{\partial x}\right)^2 + \left(\frac{\partial f}{\partial y}\right)^2} \tag{2}$$

According to this configuration, since the total variation is used as the index of the sharpness, the appropriate correction function can be specified.

(4) The information processing system according to any one of (1) to (3), wherein a correction step outputs an image that is reconstructed by using the correction function specified in the shift quantity specification step.

According to such a configuration, the corrected reconstruction image which is restructured by using the correction function can be output.

(5) The information processing system according to any one of (1) to (4), wherein the correction function is stored for each measurement condition, and the measurement condition includes at least one condition of: a number of images to be acquired; scanning speed; exposure time; or an magnification ratio of an image to be acquired.

According to this configuration, correction of the SOD shift corresponding to various measurement conditions can be executed.

(6) The information processing system according to any one of (1) to (5), wherein the predetermined plane includes a plane that is parallel to an optical axis of the X-ray.

According to this configuration, since the plane of the image to be reconstructed can be limited to the plane parallel to the optical axis, the logic for specifying the correction function can be simplified.

(7) The information processing system according to any one of (1) to (6), wherein, in the tentative correction step, values obtained by dividing a range of values set by a user by step widths set by the user are used as the plurality of the tentative correction parameter.

According to this configuration, the tentative correction parameter can be verified within the range set arbitrarily by the user.

(8) An information processing method executed by an information processing system for processing information between a CT device and the information processing system, wherein the CT device includes: a sample stage on which a sample is placed; an X-ray generator configured to generate a cone beam X-ray toward the sample and to be rotated around a rotation axis with respect to the sample stage; and a detector configured to detect the cone beam X-ray that is transmitted through the sample as measurement data, the information processing system includes at least one processor that is configured to execute each step of: a tentative correction step of acquiring a tentatively corrected reconstruction image for each plurality of tentative correction parameter from the measurement data, by using a tentative correction function which employs an angle position of the X-ray generator with respect to the rotation axis as a variable and the tentative correction parameter related to an SOD as a parameter, where the SOD is a distance between the X-ray generator and the rotation axis, and the tentatively corrected reconstruction image is an image obtained by reconstructing the sample in a predetermined plane; an index calculation step of calculating an index related to sharpness of each of the tentatively corrected reconstruction image acquired for said each plurality of the tentative correction parameter; and a shift quantity specification step of specifying a correction function of the SOD based on a plurality of the calculated index.

According to this configuration, the SOD shift can be corrected without requiring any distance sensor for the CT device.

(9) A non-transitory computer-readable storage medium storing a program configured to allow a computer to function as the at least one processor of the information processing system according to any one of (1) to (7).

According to this configuration, the SOD shift can be corrected without requiring any distance sensor for the CT device.

(10) An information processing apparatus comprising at least one processor executing each step of: a tentative correction step of acquiring a tentatively corrected reconstruction image for each plurality of tentative correction parameter from measurement data including a projection image of a sample, by using a tentative correction function which employs an angle position of an X-ray generator of a CT device with respect to a rotation axis as a variable and the tentative correction parameter related to an SOD as a parameter, where the SOD is a distance between the X-ray generator and the rotation axis, and the tentatively corrected reconstruction image is an image obtained by reconstructing the sample in a predetermined plane; an index calculation step of calculating an index related to sharpness of each of the tentatively corrected reconstruction image acquired for said each plurality of the tentative correction parameter; and a shift quantity specification step of specifying a correction function of the SOD based on a plurality of the calculated index.

According to this configuration, the SOD shift can be corrected without requiring any distance sensor for the CT device.

(11) A non-transitory computer-readable storage medium storing a program configured to allow a computer to function as the at least one processor of the information processing apparatus according to (10).

According to this configuration, the SOD shift can be corrected without requiring any distance sensor for the CT device.

Needless to say, the present disclosure is not limited to the above description.

Finally, various embodiments of the invention have been described, which are presented as examples and are not intended to limit the scope of the invention. The novel embodiments can be implemented in various other forms, and various omissions, substitutions, and modifications can be made to the extent that they do not depart from the gist of the invention. The embodiment and variations thereof are included in the scope or gist of the invention and within the scope of the invention and its equivalents described in the claims.

The invention claimed is:

1. An information processing system for processing information between a CT device and the information processing system, wherein the CT device includes:

- a sample stage on which a sample is placed;
- an X-ray generator configured to generate a cone beam X-ray toward the sample and to be rotated around a rotation axis with respect to the sample stage; and
- a detector configured to detect the cone beam X-ray that is transmitted through the sample as measurement data, the information processing system comprising at least one processor that is configured to execute each step of:

- a tentative correction step of acquiring a tentatively corrected reconstruction image for each plurality of tentative correction parameter from the measurement data, by using a tentative correction function which employs an angle position of the X-ray generator with respect to the rotation axis as a variable and the tentative correction parameter related to an SOD as a parameter, where
  - the SOD is a distance between the X-ray generator and the rotation axis, and
  - the tentatively corrected reconstruction image is an image obtained by reconstructing the sample in a predetermined plane;
- an index calculation step of calculating an index related to sharpness of each of the tentatively corrected reconstruction image acquired for said each plurality of the tentative correction parameter; and a shift quantity specification step of specifying a correction function of the SOD based on a plurality of the calculated index.

2. The information processing system according to claim 1, wherein the tentative correction parameter includes a first tentative correction parameter and a second tentative correction parameter, the tentative correction function is represented by a following formula (1), $$f(\theta; SOD_{amp}, SOD_{offset}) = SOD_{amp}\cos\theta - SOD_{offset} \quad (1)$$

where the variable of the angle position of the X-ray generator with respect to the rotation axis is denoted by θ, the first tentative correction parameter is denoted by an $SOD_{amp}$, and the second tentative correction parameter is denoted by an $SOD_{offset}$, and the tentative correction step varies the first tentative correction parameter and the second tentative correction parameter.

3. The information processing system according to claim 1, wherein the index related to the sharpness is a total variation (TV) represented by a following formula (2), and $$TV = \int dxdy\sqrt{\left(\frac{\partial f}{\partial x}\right)^2 + \left(\frac{\partial f}{\partial y}\right)^2} \quad (2)$$

the shift quantity specification step specifies the correction function by applying the tentative correction parameter that corresponds to a maximal value of the plurality of the calculated index to the tentative correction function.

4. The information processing system according to claim 1, wherein a correction step outputs an image that is reconstructed by using the correction function specified in the shift quantity specification step.

5. The information processing system according to claim 1, wherein the correction function is stored for each measurement condition, and the measurement condition includes at least one condition of: a number of images to be acquired; scanning speed; exposure time; or an magnification ratio of an image to be acquired.

6. The information processing system according to claim 1, wherein the predetermined plane includes a plane that is parallel to an optical axis of the X-ray.

7. The information processing system according to claim 1, wherein, in the tentative correction step, values obtained by dividing a range of values set by a user by step widths set by the user are used as the plurality of the tentative correction parameter.

8. An information processing method executed by an information processing system for processing information between a CT device and the information processing system, wherein the CT device includes:

a sample stage on which a sample is placed;

an X-ray generator configured to generate a cone beam X-ray toward the sample and to be rotated around a rotation axis with respect to the sample stage; and a detector configured to detect the cone beam X-ray that is transmitted through the sample as measurement data, the information processing system includes at least one processor that is configured to execute each step of:

a tentative correction step of acquiring a tentatively corrected reconstruction image for each plurality of tentative correction parameter from the measurement data, by using a tentative correction function which employs an angle position of the X-ray generator with respect to the rotation axis as a variable and the tentative correction parameter related to an SOD as a parameter, where the SOD is a distance between the X-ray generator and the rotation axis, and the tentatively corrected reconstruction image is an image obtained by reconstructing the sample in a predetermined plane;

an index calculation step of calculating an index related to sharpness of each of the tentatively corrected reconstruction image acquired for said each plurality of the tentative correction parameter; and a shift quantity specification step of specifying a correction function of the SOD based on a plurality of the calculated index.

9. A non-transitory computer-readable storage medium storing a program configured to allow a computer to function as the at least one processor of the information processing system according to claim 1.

10. An information processing apparatus comprising at least one processor executing each step of:

a tentative correction step of acquiring a tentatively corrected reconstruction image for each plurality of tentative correction parameter from measurement data including a projection image of a sample, by using a tentative correction function which employs an angle position of an X-ray generator of a CT device with respect to a rotation axis as a variable and the tentative correction parameter related to an SOD as a parameter, where the SOD is a distance between the X-ray generator and the rotation axis, and the tentatively corrected reconstruction image is an image obtained by reconstructing the sample in a predetermined plane;

an index calculation step of calculating an index related to sharpness of each of the tentatively corrected reconstruction image acquired for said each plurality of the tentative correction parameter; and a shift quantity specification step of specifying a correction function of the SOD based on a plurality of the calculated index.

11. A non-transitory computer-readable storage medium storing a program configured to allow a computer to function as the at least one processor of the information processing apparatus according to claim 10.

* * * * *